June 21, 1927.

R. C. MINTON

1,633,490

SWITCHING ARRANGEMENT FOR ELECTRIC SUBSTATIONS

Filed Sept. 8, 1924   6 Sheets-Sheet 2

R. C. MINTON 1,633,490

SWITCHING ARRANGEMENT FOR ELECTRIC SUBSTATIONS

Filed Sept. 8, 1924

INVENTOR
R.C. Minton,
BY Watson, Coit, Morse & Grindle,
ATT'YS.

Patented June 21, 1927.

1,633,490

UNITED STATES PATENT OFFICE.

RICHARD CALDWELL MINTON, OF EAST BOLDON, ENGLAND, ASSIGNOR TO A. REYROLLE & COMPANY LIMITED, OF HEBBURN-ON-TYNE, ENGLAND, A BRITISH COMPANY.

SWITCHING ARRANGEMENT FOR ELECTRIC SUBSTATIONS.

Application filed September 8, 1924, Serial No. 736,630, and in Great Britain November 3, 1923.

This invention relates to switching arrangements for electric substations of the automatic or semi-automatic type which are thrown into the circuit to which they are to supply power when the conditions of this circuit are such as to need the power.

It frequently happens that although at any given moment the power of the substation is needed, yet before the substation is ready to be switched in the conditions may have changed, or possibly some more or less transient delay may occur due to conditions in the substation itself so that it is not ready to be thrown in automatically within the time interval normally provided by the relays or other devices.

The primary object of the present invention is to provide for such contingencies.

This is accomplished according to the invention by the provision of contact-making and time interval devices so arranged as to render it possible for two or more (preferably three) consecutive attempts to be made to throw the substation on to its load. If these attempts are unsuccessful the devices preferably lock out the substation and give an indication or alarm at the central or control station.

Conveniently the supply of power to the motor-driven substation generator is controlled by a master control relay, the circuit to which is in turn controlled by a starting-up device having associated with it time-delay mechanism so arranged as to allow three attempts to be made to start up the generator and throw the substation on to its load. The starting-up device may comprise a relay controlled in accordance with the voltage or other conditions in the load circuit into which the substation is to be switched, the time-delay mechanism then being such as to ensure that the necessary conditions in the load circuit persist for a predetermined time before starting-up operations commence. Preferably the starting-up device and its time-delay mechanism are arranged to ensure that apparatus in the substation itself functions properly before the substation can be thrown on to its load, whilst a shutting-down device also provided with time-delay mechanism ensures that the conditions on the load circuit are suitable for the substation to be thrown on to its load when starting-up operations are completed. The time-delay mechanisms associated with the starting-up and the shutting-down devices are preferably driven from the same motor, each mechanism being provided with means for locking-out the substation in the event of failure after more than one (preferably three) attempts to start up the generator or to throw it on to its load. Preferably a motor-driven multiple time element device such as is described in the specification of application for Letters Patent of the United States of America Serial No. 706,104 (A. Reyrolle & Company Limited, assignees of F. N. Linstow) is employed for this purpose.

Although applicable to other types of substation, such for example as a substation provided with means for partial or complete manual control, the invention is more especially applicable to a fully automatic motor-converter substation and the accompanying drawings illustrate by way of example the invention as applied thereto. In these drawings.

Figure 1:
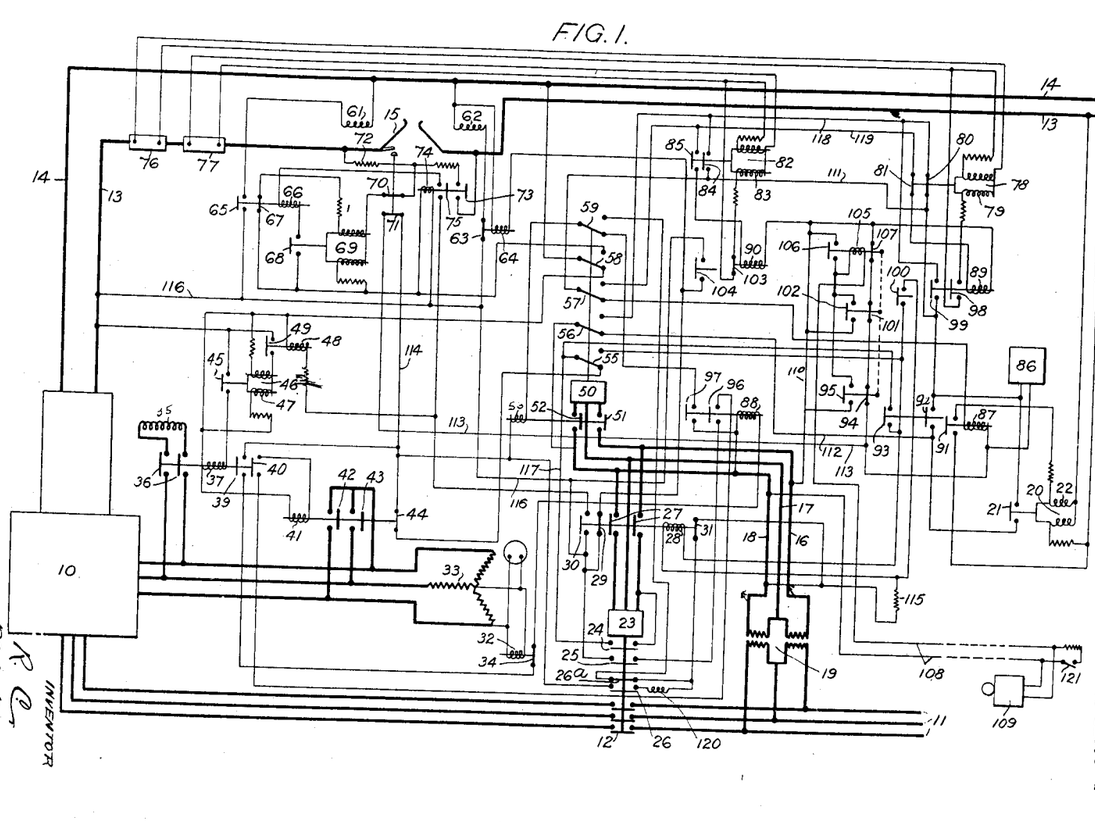
Figure 1 is a diagram showing the electrical circuits in the substation, only those circuits being shown which are necessary to the understanding of the invention.

The arrangement of circuits in the substation, which are shown in Figure 1 in the condition ready for starting-up, will first be described. The motor converter, which is indicated diagrammatically at 10, is fed with three-phase alternating current by the A. C. mains 11 through a main oil switch 12, and delivers continuous current through the D. C. mains 13, 14, of which the former contains a high speed circuit breaker 15. The substation is provided with A. C. control busbars 16, 17, 18 which are supplied through a potential transformer 19 from the A. C. mains 11.

The initial starting up circuit may be made by means of a voltage relay, a current relay, a time switch or other device arranged to suit the conditions of the particular substation. In the arrangement illustrated a low voltage "starting-up" relay 20 is employed. This starting-up relay 20 is connected across the D. C. mains 13, 14 and is set so that the machine will pick up an economical load when switched in. So long as the voltage across the relay exceeds this setting, the relay will be inoperative with its contact 21 open, but when the voltage falls to this figure the relay is set into operation. This relay 20 is of robust construction and to obtain the required sensitiveness it is fitted with a separate lifting coil 22.

The main oil switch 12 is closed by means of a three-phase induction motor 23, four auxiliary switches 24, 25, 26 and 26ᵃ being simultaneously operated. The motor 23 is supplied with power from the A. C. control busbars 16, 17, 18 through switches 27 operated by a master control relay 28, one phase 17 being taken direct to the motor 23. The master control relay 28 also operates three auxiliary switches 29, 30, 31.

Three of the rotor phases of the motor converter 10 are connected to a three-phase star-connected non-inductive starting resistance 33. Across one phase of this resistance 33 the operating coil of a synchronizing relay 32 is connected in parallel with a voltmeter, this relay controlling contacts 34. A choke coil 35 is also connected across the starting resistance 33 through contacts 36 of a choke coil contactor 37, which also controls two auxiliary contacts 39, 40. Connected with the operating coil of the choke coil contactor 37 is the operating coil of a short-circuiting contactor 41 which controls short-circuiting contacts 42, 43, and an auxiliary contact 44. The operating coil of the choke coil contactor 37 is in circuit with the contact 45 of a choke coil relay 46 provided with a lifting coil 47. This relay 46 is in turn in circuit with the contact 49 of a polarity relay 48.

In addition to the short circuiting contacts 42, 43, suitable mechanism (forming no part of the present invention) is provided for directly short-circuiting the rotor slip rings of the motor converter 10, and this mechanism is operated by a three-phase rotor short-circuiting motor 50. This motor 50 is supplied with current from the A. C. control busbars 16, 17, 18, through contacts 51, 52 of a relay 53, one phase 17 being taken direct to the motor. In addition to operating the rotor short-circuiting mechanism the motor 50 controls a number of "police" switches 55, 56, 57, 58, 59, each of which is transferred (when the motor 50 is operated) from a "starting-up" contact to a "running" contact.

The high speed circuit breaker 15 is controlled by a closing coil 61 and a holding coil 62. The holding coil 62 is in circuit with the contact 63 of a holding coil contactor 64. The closing coil 61 is similarly in circuit with the contact 65 of a closing coil contactor 66 which also controls another contact 67. The operating coil of the contactor 66 is in circuit with the contact 68 of a load discriminating relay 69. The operating coils of this relay 69 are connected (through one of two auxiliary contacts 70, 71 operated simultaneously with the high speed circuit breaker 15) with a tapping on a bridging resistance 72, which is connected across the contacts of the high speed circuit breaker 15 through the contact 73 of a bridging resistance contactor 74. This contactor 74 also controls a second contact 75, which is in circuit with the operating coil of the closing coil contactor 66.

The D. C. main 13 is provided between the motor converter 10 and the high speed circuit breaker 15 with two shunts 76, 77, of which the former is connected to the operating coil of an underload relay 78 having a lifting coil 79. This underload relay 78 controls two contacts 80, 81. The shunt 77 is similarly connected to the operating coil of an overload relay 82 having a lifting coil 83 and controlling two contacts 84, 85.

In addition to the above elements the substation includes a multiple time element device, the mechanical construction of which will be described later with reference to Figures 2 to 6. Figure 1 shows diagrammatically the electrical connections of this device, which comprises a small single-phase motor 86 and four contact-making time element devices 87, 88, 89, 90, which may conveniently be termed "clutches." These four clutches cooperate respectively with the starting-up relay 20, the synchronizing relay 32, the underload relay 78 and the overload relay 82. The starting-up clutch 87 controls five contacts 91, 92, 93, 94, 95. Contact 91 is made immediately the mechanism starts to move, and remains closed during the whole cycle of operations. After a delay of from five to thirty seconds depending upon the setting contacts 92 and 93 are closed simultaneously, the former remaining closed during the whole cycle of operations. The contact 93 remains closed for a minute and three-quarters, and if the plant goes on load normally, the mechanism is reset. If the plant fails to start up before the expiration of this time delay, the contact 93 opens for from seven to ten seconds and closes again for a minute and three-quarters to allow a second attempt to start up the plant. If this attempt fails, yet another attempt is allowed during a similar time interval. If the plant fails to start up at the third attempt, the contacts 94 and 95 are operated. The synchronizing clutch 88 has two contacts 96, 97, which are closed simultaneously after a time delay of three to twelve seconds from the operation of the clutch coil 88, according to the setting, and remain closed until the de-energization of the coil 88. The underload clutch 89 is arranged in a similar manner to the starting-up clutch 87 and also controls five contacts 98, 99, 100, 101, 102. The first two contacts 98, 99, are closed simultaneously and after a predetermined time interval the contact 100 closes, the remaining two contacts being operated after a further time interval long enough to allow three attempts to go on load. The overload clutch 90 has two contacts 103, 104, of which the former opens immediately after the clutch coil is energized and the latter after a time interval which is adjustable between five and sixty seconds. The multiple time element device is also provided with a resetting coil 105 which controls two contacts 106, 107. This coil 105 receives its current from the A. C. control busbars 16, 18, through a pilot circuit 108 which is led from the substation to a main controlling station. An alarm bell 109 and a resetting switch 121 are connected into the pilot circuit 108 at the main station.

The electrical connections of the various elements in the substation with one another will be clear from Figure 1 of the drawings and from the following description of the operation of the plant.

The operating coil of the starting-up relay 20 is connected across the D. C. mains 13, 14, and is set so that the plant will pick up an economical load when switched in. When the voltage across the relay falls to this figure it closes its contact 21 and thus closes a circuit to the motor 86 and the starting-up clutch 87. This circuit passes from the control busbar 16 through the lead 110 and the closed contacts 107, 101 and 94, after which it divides, one part passing through the motor 86 whilst the other part passes through the starting-up clutch coil 87, the police switch 57 and the lead 111, the two parts then joining again into a single circuit which passes through the contact 21, the lead 112 and the police switch 56 to the control busbar 18. This energizes the motor 86 and the starting-up clutch 87 and causes the mechanism of the multiple time element device to operate in the manner hereafter to be described. The contact 91 closes immediately and completes the circuit to the lifting coil 22 of the starting-up relay 20. The mechanism then continues to run so long as the voltage across the starting-up relay 20 does not rise sufficiently to cause the two coils of the relay to open its contact 21. If the voltage does rise, the contact 21 is opened and the motor 86 and the clutch 87 are de-energized whereupon the mechanism resets itself.

If on the other hand a condition of low voltage persists for the predetermined time setting of the starting-up clutch 87, the contacts 92 and 93 are closed. The contact 92 short-circuits the starting-up relay contact 21, and as this contact 92 remains closed during the whole cycle of operations, it will be seen that the subsequent operations are independent of the fluctuations of voltage across the mains 13 and 14 and the consequent opening and closing of the relay contact 21 during this period.

The contact 93 completes the circuit to the operating coil of the master control relay 28, this circuit passing from the busbar 16 through the lead 110, the contacts 107, 101 and 94, the lead 113, the auxiliary contact 71 of the high speed circuit breaker 15, the lead 114, the contact 44, the police switch 55, the contact 93, the relay coil 28 and the lead 115 to the busbar 18. The master control relay 28 is so arranged that it will not operate unless the voltage across the A. C. control busbars is above a predetermined value. It will be noticed that the closed contacts 71 and 44 are included in the operating circuit for the master control relay 28, and this ensures that the master control relay will not operate (and therefore also that the machine will not start up) unless the high speed circuit breaker 15 and the slip ring short-circuiting contactor 41 are in their normal "standing" positions.

The operating coil of the master control relay 28 having been energized, its contacts are operated, so that the contacts 27 and 30 close and the contacts 29 and 31 open. Contacts 27 close the circuit from the control busbars 16 and 18 to the three-phase motor 23 controlling the main oil switch 12, the third phase being taken direct from the busbar 17 to the motor. Contacts 29 and 31 serve no useful purpose at this stage of the opertions and do not come into service until the master control relay 28 is deenergized. Contact 30 completes the circuit to the polarity relay 48, this circuit passing from the D. C. main 13 through the lead 116, the contact 30, the operating coil of the polarity relay 48 and the police switch 58 to the other D. C. main 14. Since there is no D. C. voltage across the D. C. mains 13, 14 between the circuit breaker 15 and the motor converter 10 at this stage, the polarity relay 48 is not energized until the D. C. voltage builds up with the proper polarity when the motor converter is running.

When the motor 23 closes the main oil switch 12, it also operates the auxiliary switches 24, 25, 26 and 26ª. Switch 24 serves to provide an alternative feed to the master control relay 28 direct from the control busbar 16 through one of the contacts 27, the switch 24, the lead 117, the contact 93, the relay coil 28 and the lead 115 to the busbar 18, thus making the energizing of the master control relay 28 independent of the operation of the police switch 55 and of the contacts 44 and 71. The operation of the switch 25 closes part of a circuit to the operating coil of the short-circuiting contactor 41 as will be described later. Switches 26 and 26ª do not at present serve any useful purpose.

The main oil switch 12 having closed, the extra high tension supply through the A. C. mains 11 is led directly to the stator windings of the motor converter 10 and causes the rotor thereof to rotate. When the machine approaches synchronous speed the E. M. F.'s induced in the rotor and armature will alternately be in opposition and conjunction, and consequently the current flowing in the starting resistance 33 will be small and large alternately and will cause the needle of the synchronizing voltmeter connected across this resistance to oscillate.

The machine now runs up to speed, and as the D. C. voltage builds up the operating coil of the polarity relay 48 is energized from the D. C. mains 13, 14, through the circuit described above which includes the master control relay contact 30 and the police switch 58. If the D. C. voltage is building up with its correct polarity, the relay 48 will close its contact 49 when the voltage reaches say 350 volts, but otherwise this relay will remain inoperative and the machine will not go on load at first attempt. The closing of the contact 49 energizes the two operating coils of the choke coil relay 46 through a circuit from the D. C. mains 13, 14, including the police switch 58. The choke coil relay 46 is set to close its contact 45 when the D. C. voltage rises to a predetermined voltage. The closing of the contact 45 puts the operating coil of the choke coil contactor 37 in parallel with the operating coils of the choke coil relay 46 and, therefore causes this contactor to operate its contacts.

The contacts 36 close, and connect the choke coil 35 across two of the phases taken to the starting resistance 33, this choke coil assisting in making the machine self-synchronizing. The diminishing voltage fluctuations across the starting resistance 33 are followed by the synchronizing relay. Contact 39 closes and completes a circuit from the control busbar 18 through the operating coil of the synchronizing clutch 88, the synchronizing relay contact 34, the contact 39, and the lead 114, and thence either through the contact 71, the lead 113, the contacts 94, 101 and 107 and the lead 110 or through the contact 44, the police switch 55, the lead 117, the switch 24 and one of the contacts 27 to the control busbar 16. The synchronizing relay 32 is set so as to open its contact 34 when the voltage reaches a predetermined minimum value. The oscillations in voltage will cause the time delay mechanism of the synchronizing clutch 88 to be brought into operation each time the voltage passes zero. This mechanism is instantly reset when the synchronizing relay 32 opens its contact 34.

The time delay setting of the clutch 88 is adjustable between three and twelve seconds and it is set so as to close its contacts after a continuous period of operation of from three to six seconds. As the choke coil 35 pulls the machine into synchronism, the frequency of the oscillations of voltage across the starting resistance 33 diminishes until the voltage falls slowly to zero and remains there as long as the machine remains in synchronism. The setting of the time delay mechanism of the synchronizing clutch 88 is so adjusted that it exceeds the slowest period of oscillation in voltage across the synchronizing relay 32 and thus ensures that the voltage is steady at zero and that the machine is held in synchronism by the choke coil 35.

When the contact 96 of the synchronizing clutch 88 closes, the circuit to the operating coil of the short-circuiting contactor 41 is completed, the contact 40 of the choke coil contactor being already closed. This circuit passes from the D. C. main 13, through the lead 116, the switch 25, the contacts 96 and 40, the coil 41 and the police switch 58 to the main 14. The contacts 42, 43 close and short-circuit the starting resistance 33 and at the same time the contact 44 opens and breaks the circuit to the master control relay 28 through the leads 114, 113 and 110, but as explained above, an alternative circuit to this relay has already been made through the switch 24. Since the starting resistance 33 is now short-circuited the synchronizing relay contact 34 will remain closed and the time delay mechanism of the synchronizing clutch 88 will continue to run, keeping its contacts 96, 97 in the closed position.

The contact 97 completes a circuit to the rotor short-circuiting motor relay 53, this circuit passing from the control busbar 18 through the contact 97, the police switch 59, the coil 53, the contact 71, the lead 113, the contacts 94, 101 and 107 and the lead 110 to the busbar 16. This relay closes the contacts 51, 52 and so connects the motor 50 to all three phases of the A. C. control busbars.

The motor 50 now starts to rotate and the first movement of the short-circuiting mechanism transfers the police switch 55 from its starting-up position to its running position. This again breaks the circuit to the master control relay 28 through the leads 114, 113 and 110 and the (now open) contact 44, but leaves the relay still supplied through the alternative circuit. This second breaking of the circuit is necessary in order to ensure that if the plant is shut down for any reason while the motor 50 is running, the starting-up circuit will be permanently interrupted and so prevent the closing of the main oil switch 12 with the rotor short-circuited and the short-circuiting operation not wholly completed.

The short-circuiting operation takes about four seconds and when the short-circuiting contacts are right home, the remainder of the police switches are transferred from their starting-up positions to their running positions. It will be appreciated that the main function of these police switches is to ensure that the various elements of the plant are in their correct positions during the starting-up period.

Police switch 55 when transferred to its running position is in parallel with the starting-up clutch contact 93 and thus forms part of the alternative circuit previously referred to for the master control relay 28. Contact 93 maintains the circuit to the master control relay during the synchronizing and short-circuiting periods, and the transfer of the police switch 55 to its running contact anticipates the opening of contact 93 and maintains the circuit to the master control relay during running conditions.

Police switches 56 and 57 are transferred from their starting-up positions and consequently break the circuit to the motor 86 and the operating coil of the starting-up clutch 87, the contacts thereof being opened. In their running positions, however, they again make a circuit to the motor 86 and are also in circuit with the operating coils of the underload clutch 89 and the overload clutch 90. This new circuit runs from the control busbar 18, through the police switch 56, the lead 118, and the underload relay contact 80, after which it divides into two parts, one part passing through the motor 86 and the contacts 94, 101, 107, whilst the other part passes through the lead 111, the police switch 57, the lead 119, the contact 81, and the operating coil of the underload clutch 89, the two parts then again joining and passing through the lead 110 to the control busbar 16. There is also another branch to this circuit which passes from the lead 119 through the (now open) contact 85 of the overload relay 83, to the operating coil of the overload clutch 90 and thence to the lead 110. The high speed circuit breaker 15 being still open, a condition of underload (no load) exists, and consequently the time delay mechanism of the underload clutch 89 commences to run and will continue until the circuit breaker 15 is closed and the station put on load.

Police switch 58, when transferred from its starting-up contact breaks the operating circuits to the polarity relay 48, the choke coil relay 46, the choke coil contactor 37 and the short-circuiting contactor 41, and the contacts associated therewith consequently return to their original position. The police switch 58 is now on its running contact in which it completes the circuit from the D. C. mains 13 and 14 to the bridging resistance contactor 74, the load discriminating relay 69 and the closing coil contactor 66, the circuit to the latter still being interrupted by the contacts 68 and 75.

Police switch 59 is transferred from its starting-up contact and breaks the operating circuit to the short-circuiting motor relay 53, which opens its contacts 51, 52 and stops the motor 50. This switch 59 in its running position forms part of a circuit employed during shutting-down operations.

When the bridging resistance contactor 74 is energized by the transfer of the police switch 58 to its running position, it closes its contacts 73, 75. The contact 73 connects the bridging resistance 72 across the circuit breaker 15 and thus closes the D. C. main 13 through this resistance, and this circuit remains closed throughout the running of the machine. The position of the tapping on the bridging resistance 72 from which the connection passes to the operating coils of the load discriminating relay 69 is such that the voltage across this relay 69 bears a definite relation to the load, the machine will pick up when switched in, an increase in the load to be picked up causing a decrease in the voltage across the relay 69. The setting of this relay is adjustable. When the relay 69 closes its contact 68, the circuit to the operating coil of the contactor 66 is completed, since the contact 75 is now closed (this circuit passing through the closed contact 30), and consequently this contactor closes its contact 65 and opens its contact 67. The closing of the contact 65 energizes the circuit breaker closing coil 61 which draws down the armature on to the holding magnet. Since the contact 63 of the holding coil contactor 64 is normally closed, the holding coil 62 is energized so long as the machine is up to voltage, and this coil picks up the armature which when at the end of its travel breaks the auxiliary contacts 70 and 71. The breaking of the contact 70 deenergizes the load discriminating relay 69 which opens its contact 68, thus breaking the circuit to the operating coil of the contactor 66 which in turn operates its contacts and deenergizes the closing coil 61, the circuit-breaker 15 being held in the closed position by the holding coil 62. The opening of the contact 71 completely breaks the already open circuit through the lead 114.

The machine is now delivering load through the D. C. mains 13, 14, and if this load is above the setting of underload relay 78, its contacts 80, 81 will open, thus deenergizing the underload clutch coil 89. The circuit to the motor 86 will however remain closed through the contact 99 until the time delay mechanism has been reset.

The time taken to reset the mechanism is approximately three quarters of that taken during the forward motion so as to ensure average resetting.

Under normal conditions the plant now continues to supply the D. C. mains until it is interrupted by the operation of the overload relay 82 or the underload relay 78. The overload relay 82 has an adjustable setting and the time delay mechanism of the overload clutch 90 may also be adjusted between five and sixty seconds. When the overload relay operates it closes its contacts 84, 85 and thus completes circuits to the motor 86 and the overload clutch 90. If the overload does not persist for the time setting, the device instantly resets itself. On the other hand, if the time setting is exceeded, the contact 104 is closed and completes the circuit to the operating coil of the holding coil contactor 64 which opens its contact 63 and deenergizes the holding coil 62, whereupon the high speed circuit-breaker 15 opens. A condition of underload (no load) now exists and the underload relay commences to function in the manner previously described.

The circuit-breaker 15 having opened the contact 70 is closed and the load discriminating relay 69 is again energized. If the load is below its setting it will close its contact 68 and again allow the machine to be put on load. If the relay 69 does not close its contact 68, the underload mechanism will continue to run to the end of its time setting. It will then shut down the plant by closing the contact 100 and thus short-circuiting the master control relay 28. Thus the underload mechanism will shut down the plant when the load is below its setting under normal underload conditions or when a condition of no-load exists owing to the operation of the overload relay 82.

When the master control relay 28 is deenergized its contacts 27 and 30 open and its contacts 29 and 31 close. If the circuit breaker 15 is still closed, as when the plant is shutting down under normal underload conditions, the contact 29 closes the circuit to the holding coil contactor 64 which opens its contact 63 and deenergizes the holding coil 62 thus opening the circuit breaker 15. This closes the contact 71 and completes a circuit from the bus-bar 16, through the contact 71, the lead 114 and the auxiliary switch 26 to a trip coil 120 for the main oil switch 12, the return circuit passing through the (now closed) contact 31 and the lead 115 to the busbar 18. The trip coil 120 is thus energized and opens the main oil switch 12. It will be seen that under normal shutting-down conditions the D. C. end of the machine is opened before the main oil switch 12 is tripped.

The opening of the main oil switch 12 brings the auxiliary switches 24, 25, 26 and 26ª back to their original positions. The closing of the switch 26ª completes a circuit from the busbar 18, through the contact 31, the switch 26ª, the police switch 59, the operating coil of the motor relay 53, the lead 114, the contact 71, the lead 113, the contacts 94, 101 and 107 and the lead 110 to the busbar 16, thus energizing the relay 53 and causing it to close its contacts 51 and 52 and start the motor 50. The motor then transfers the police switches 55, 56, 57, 58, 59 back to their starting-up positions, the movement of the switch 59 breaking the circuit to the relay 53 and stopping the motor 50.

The whole mechanism is now completely shut down and the various parts of the apparatus are in their correct positions for starting-up.

As has already been mentioned, if any of the devices employed in starting-up fail to function properly the time delay mechanism of the starting-up clutch 87 will allow three attempts to put the plant on load. Similarly if the external conditions are such that the load discriminating relay 69 prevents the high speed circuit breaker 15 from closing a though the starting-up operations have been performed satisfactorily, the time delay mechanism of the underload clutch 89 will act in a similar manner. The underload time delay mechanism allows an interval of from three to twelve minutes (according to its setting) before shutting down the plant after the first attempt. The time interval for the second and third attempts will be about four minutes each, and in the latter case the time taken completely to shut down the station is about eighteen minutes if the underload mechanism is operating with its full time setting. If the third attempt fails either during starting-up or when the circuit breaker has not closed, the starting-up clutch 87 or the underload clutch 89, as the case may be, will shut down the station and will also operate contacts 94 and 95 or contacts 101 and 102. Contact 95 or contact 102 will complete a circuit to the resetting coil 105 from the busbars 16, 18 through the pilot circuit 108 and will cause the alarm bell 109 at the main controlling station to ring and thus give warning that the station is locked out. Contact 94 or contact 101 will also cut off the supply to the motor 86.

To reset the mechanism electrically from the main station the resetting switch 121 is operated. This energizes the resetting coil 105 and causes it to operate its contacts 106 and 107. The operation of these contacts ensures that the coil 105 will remain energized and that the supply circuit to the motor 86 will remain broken independently of the operation of the contacts 101 and 102 or 94 and 95. The resetting mechanism to be described later is then set into operation and causes all the parts of the multiple time element device to return to a position ready for starting up again. The contacts 106 and 107 return to their normal positions when the resetting switch 121 is broken again at the main station.

Figures 2–6 show the mechanical construction of the multiple time element device which is indicated diagrammatically in Figure 1 under the reference numbers 86—107. In these drawings the casing A contains the single-phase motor (referred to as 86 in Figure 1) and this motor drives a main shaft A′ carrying three pinions A², A³ A⁴. The pinion A² cooperates with two gear wheels C and B, which are respectively associated with the synchronizing clutch mechanism (88, 96, 97 on the diagram of Figure 1) and with the overload clutch mechanism (90, 103, 104 in Figure 1).

The overload clutch coil (90) is indicated at B′ and controls an armature carrying an arm B², the ends of the coil being led out to terminals B³. The arm B² carries at its end a stud B⁴ which engages with the end of the spindle B⁵ on which the gear wheel B is mounted (see Figure 4). Thus when the clutch coil B′ is energized it draws down its armature and causes the stud B⁴ to move the spindle B⁵ longitudinally against the action of an adjustable spring B⁶, until the gear wheel B is in engagement with the pinion A². The spindle B⁵ carries a cam disc D having two operative surfaces D′ D², of which the former acts on a lever E pivoted at E′, whilst the latter acts on a lever E² also pivoted at E′. Each of the two levers E E² acts on a second lever E³ pivoted at E⁴ and controlled by a spring E⁵ and these two levers E³ serve to operate contacts E⁶ E⁷, these contacts corresponding to the contacts 104 and 103 on the diagram of Figure 1. The cam disc D has a resetting spring D³ housed within it. The second cam surface D² is secured to the disc D by means of screws D⁴, and is adjustable so that the time interval between the operation of the two contacts E⁶ E⁷ can be varied.

The synchronizing clutch mechanism is generally similar to the overload clutch mechanism. The synchronizing clutch coil (88 in Figure 1) is indicated at C′, its ends being led out to terminals C³. Its armature carries an arm C², at the end of which is a stud C⁴ engaging with the end of the spindle C⁵ on which the gear wheel C is mounted. This stud C⁴ moves the spindle C⁵ longitudinally against the action of an adjustable spring when the coil C′ is energized so as to bring the gear wheel C into engagement with the pinion A². The spindle C′ carries a cam disc F which in this case has a single operative cam surface F′ cooperating with a lever F² pivoted at F³. This lever F² in turn acts on a spring controlled lever F⁴ pivoted at F⁵, the lever F⁴ serving to actuate simultaneously two contacts F⁶ F⁷. The cam disc F is also provided with a resetting spring which is not shown in the drawings but is arranged similarly to the resetting spring D³. The two contacts F⁶ F⁷ correspond to the contacts 96 and 97 shown in the diagram in Figure 1.

The pinion A³ on the shaft A′ cooperates with a gear wheel G which is associated with the starting-up time delay mechanism (87 and 91—95 in the diagram of Figure 1). The starting-up clutch coil (87) is indicated at G′ and its ends are led out to terminal G³. The armature of this coil G′ carries an arm G² at the end of which is a stud G⁴ engaging with the end of the spindle G⁵ on which the gear wheel G is mounted. The spindle G⁵ has keyed to it a worm G⁶ engaging with a worm wheel H′ fixed to a cam disc H (see Figure 3). This cam disc H has three operative surfaces H², H³, H⁴, which cooperate respectively with spring-controlled levers J, J′, J² pivoted at J³. The lever J operates the contact J⁴ (corresponding to the contact 91 of Figure 1), the lever J′ operates the contact J⁵ (corresponding to the contact 92) and the lever J² operates the three contacts J⁶ J⁷ J⁸ (corresponding respectively to the contacts 93, 94 and 95). It will be seen from an inspection of the contours of the operating cam surfaces H² H³ H⁴ that the contact J⁴ is closed as soon as the cam disc H starts to rotate, and the contact J⁵ after a short time interval. The contact J⁶ is closed after a similar time interval and opens and closes again twice more during a revolution of the cam disc, thus allowing the three attempts to start up the plant as above referred to. The contacts J⁷ J⁸ are not operated until the cam disc has made nearly a whole revolution when the operating finger of the lever J² drops into the recess H⁵. The position of the cam disc H is adjustable relative to the worm wheel H′ and it is clamped in position by means of the nut H⁶. To ensure that the contact J⁴ is operated immediately the disc H begins to move, the cam surface H² is also adjusted relative to the disc H to an extent corresponding to the adjustment of the disc H relative to the worm wheel H′ by means of the nuts H⁷. The cam disc H carries within it a resetting spring H⁸ which drives the disc H back to its original position against the braking action of the worm G⁶ when the coil G′ is deenergized and the gear wheel G moved out of engagement with the pinion A³ by the action of a spring (not shown) arranged in a similar manner to the spring B⁶ of the overload clutch mechanism. The cam disc H is under the control of the starting-up clutch coil G′ for a period depending on the adjustment of the disc relative to the worm wheel H′. If the demand for load persists beyond this period, the contact J⁵ (92) is closed and the alternate clutch and motor circuits made as described with reference to Figure 1. The cam disc H then continues to run either until the station is on load under normal conditions when the disc instantly resets itself to the zero position or until the station has failed to go on load after three attempts when the disc H is locked by means of the recess H⁵ when the alarm and lock-out circuits are made. The method of releasing the cam disc H in this case and allowing it to reset itself will be described later.

The third pinion A⁴ on the main shaft is utilized to drive the underload time delay mechanism (referred to in Figure 1 under the reference numbers 89 and 98—102). This mechanism is provided with means for reversing its direction of rotation, comprising two pinions K K′ (Figure 5) mounted on a spindle K², the pinion K normally being driven by the pinion A⁴. The time delay mechanism is driven either from the pinion K′ or direct from the pinion A⁴, through a gear wheel L, the position of which depends upon whether the underload clutch coil (89 of Figure 1) indicated at L′ is energized or not. The ends of the coil L′ are taken out to terminals L³ and the coil controls an armature carrying an arm L² on the end of which is a stud L⁴ engaging with the end of the spindle L⁵ on which the gear wheel L is mounted, this spindle being spring controlled after the manner of the spindle B⁵ of the overload clutch mechanism. The spindle L⁵ has keyed to it a worm L⁶ engaging with a worm wheel M′ fixed to a cam disc M (see Figures 2 and 3). This cam disc M has three operative cam surfaces M² M³ M⁴, which cooperate respectively with spring-controlled levers N N′ N² pivoted at N³. The lever N operates the contact N⁴ (corresponding to the contact 93 of Figure 1), the lever N′ operates the contact N⁵ (corresponding to the contact 99), and the lever N² operates the contact N⁶ (corresponding to the contact 100). The operative cam surface M² is driven frictionally from the cam disc M through springs, one of which is indicated at M⁵ and carries a projection M⁶ working between two fixed stops M⁷ M⁸. By this arrangement it is possible to ensure that the contact N⁴ controlled by this cam surface M² will be closed immediately the mechanism starts to move in a forward direction, remaining closed throughout the forward motion, and will be opened again during the reverse motion when the projection M⁶ comes against the stop M⁷. The cam surface M⁴ is adjustable relative to the cam disc M and this allows an adjustment of the time interval elapsing before the operation of the contact N⁶.

The pinions A⁴ K K′ are so related in size that the resetting movement takes about three quarters of the time taken for the forward movement, thus giving the feature of average time resetting. So long as the underload clutch coil L′ is energized, the gear wheel L is held in engagement with the pinion A⁴ and the cam disc M is driven in a forward direction. If, however, the coil L′ is deenergized when the cam disc M is away from the zero position, the gear wheel L is brought into engagement with the pinion K′, and since the alternative circuit to the motor is then completed (as described with reference to Figure 1) through the contact N⁵ (99), the cam disc M will be driven back to the zero position when the alternative circuit to the motor will again be broken by the opening of the contact N⁵. When the zero position is reached the pinion K′ is pulled out of engagement with the gear wheel L by means of a spring K³ (see Figure 5) acting on a lever K⁴ which is pivoted at K⁵ and carries a cage K⁶ in which the spindle K² carrying the pinions K K′ is mounted, a pin K⁷ being mounted on the end of the lever K⁴ in such a position that it will fall into a recess M⁹ in the cam disc M when this disc reaches its zero position. It will be noticed that when the coil L′ is deenergized as a result of the substation shutting down, the alternative circuit to the motor will not be completed owing to the fact that the police switch 56 (Figure 1) will then be in its starting-up position. Under these circumstances the resetting movement of the cam disc M will not take place and this disc will be left in the closed position with the pinion K′ in mesh with the gear wheel L. Consequently the next time the plant is started up, the reverse drive will operate during the starting-up operations. If the station goes on load the cam disc M will continue to reset itself, but if the station fails to go on load, the shutting-down operations will commence as soon as the starting-up operations are completed.

The underload time-delay mechanism is provided with a discriminating mechanism which consists of a cam O rotatable about an axle O′ and fitted on one side with ratchet teeth O² and on the other side with projections O³ with which engages a catch M¹⁰ pivoted at M¹¹ to the cam disc M. This catch M¹⁰ is normally held in the position shown by means of a spring M¹² and carries an upwardly projecting plate M¹³. When the cam disc M is rotated in a forward direction, the catch M¹⁰ engages with the first of the projections O³ and thus rotates the cam O and a disc O⁵ carried thereby against the action of a spring O⁴. When the cam disc M reaches this position it operates the contact N⁶ and shuts down the plant. This deenergizes the coil L′ and brings the gear wheel L into engagement with the pinion K′.

The cam disc M then moves in the reverse direction, and, if the station starts up again immediately, the coil L' is again energized, the cam disc M then moving forwards again. The catch M¹⁰ now engages with the second projection O³ and rotates the cam O and the disc O⁵ one step further. The contact N⁶ is again operated and the cam disc M moves backwards and forwards once again until the catch M¹⁰ engages with the third projection O³. This rotates the cam O and the disc O⁵ far enough to bring a recess O⁶ in this disc below the finger P of a spring-controlled lever P' pivoted at N³. The other end of this lever P' serves to actuate two contacts P³ P⁴ (corresponding respectively to the contacts 101 and 102 of Figure 1), when the finger P falls into the recess O⁶. The ratchet teeth O² are provided to prevent the resetting of the cam O when the catch M¹⁰ is no longer in engagement with one of the projections O³, and these teeth O² are engaged by a pawl O⁷ carried on an arm O⁸. This mechanism serves to prevent the repeated starting-up and shutting-down of the substation which might occur as a result of an external line fault. If the substation starts up and shuts down three times without going on load, it is locked out by the finger P falling into the recess O⁶ and operating the lock-out contact P³.

Figure 2:
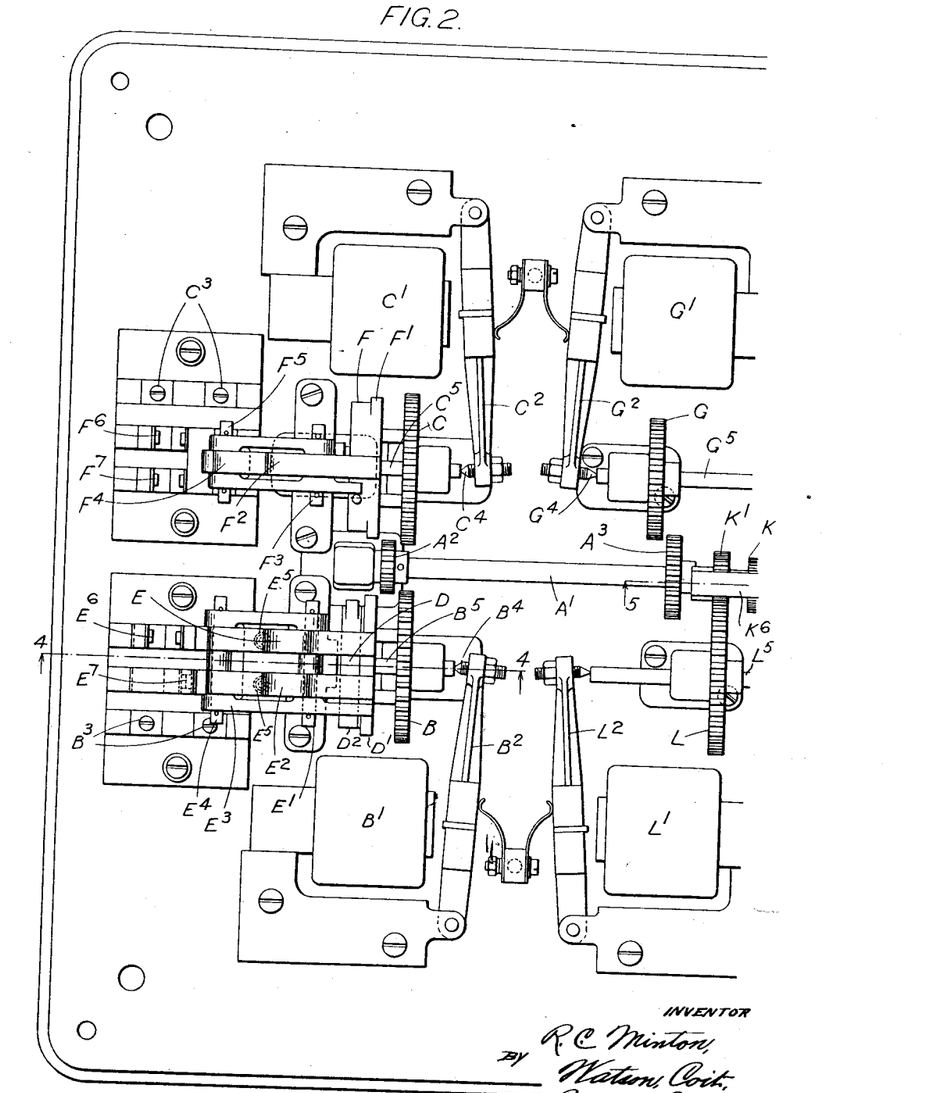
Figure 2 shows in plan a motor-driven multiple time element device employed in the substation.
Figure 3:
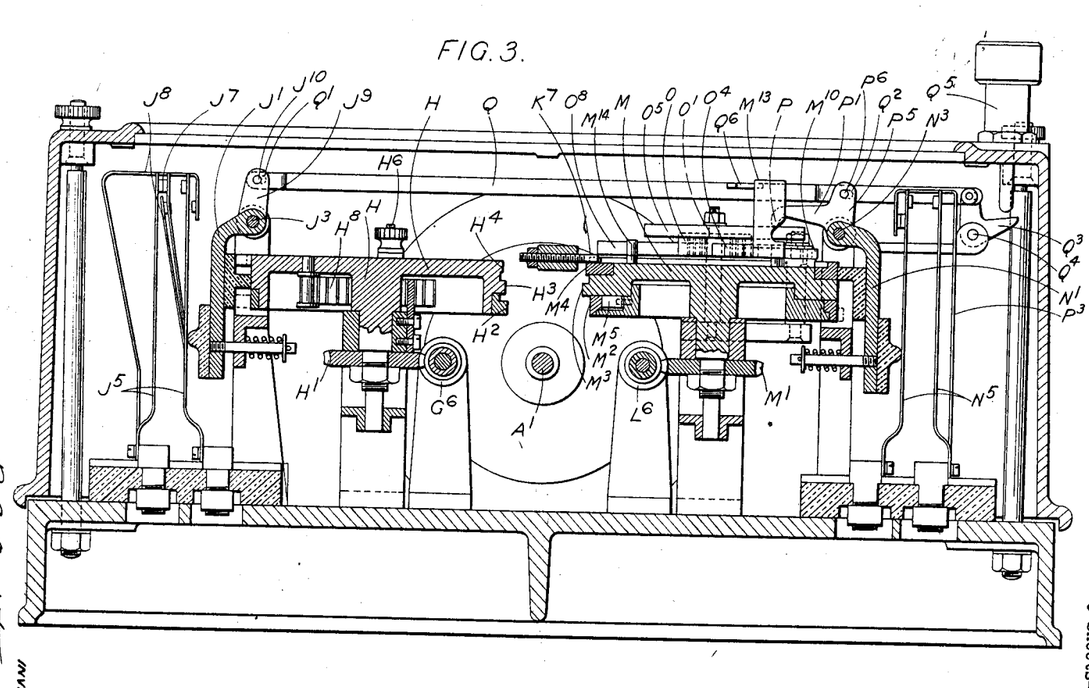
Figures 3–6 are sections on the lines 3—3, 4—4, 5—5, 6—6 respectively of Figure 2.
Figure 4:
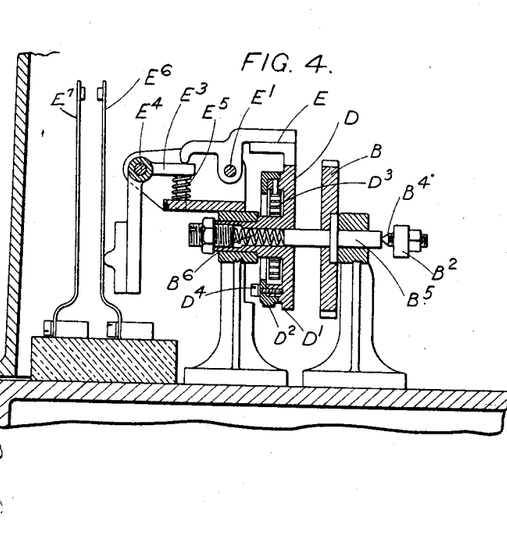
Figure 5:
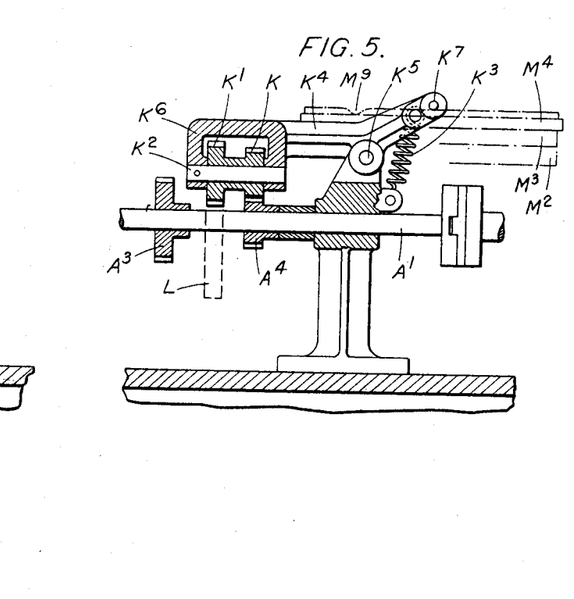
Figure 6:
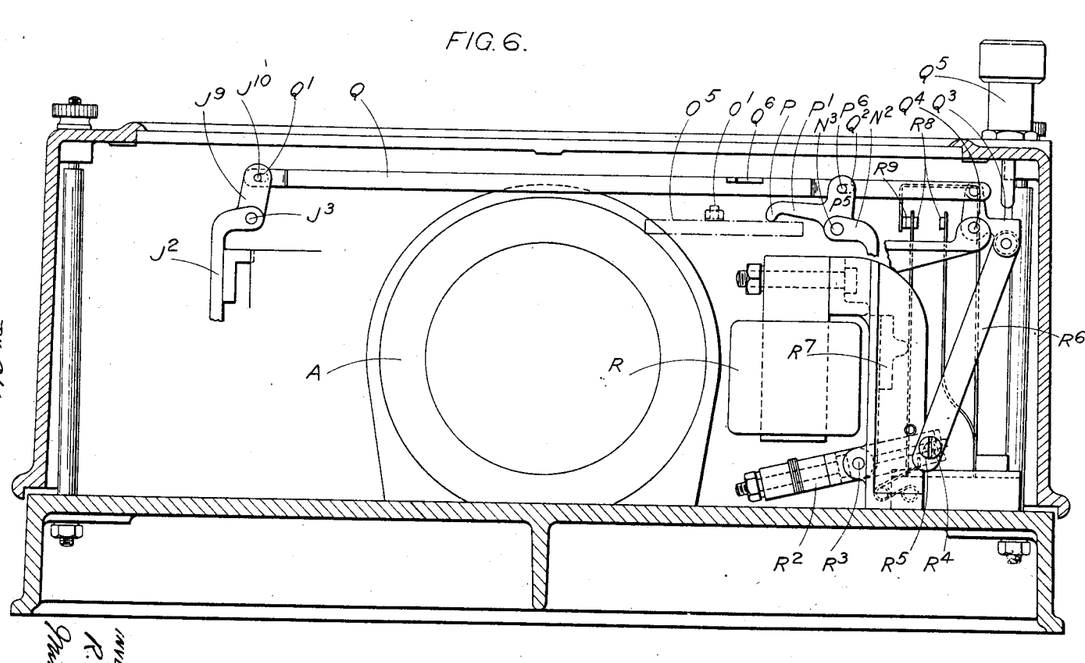

When the substation has been locked out as a result of the operation of the starting-up clutch or the underload clutch, it can be reset, after the cause of the failure to go on load has been determined and corrected, either by hand or electrically from the main control station if pilot wires are available (see Figures 2 and 6). For this purpose the levers J² and P' (each of which controls a lock-out contact), are each provided with an extra arm J⁹ (or P⁵) carrying a pin J¹⁰ (or P⁶). These two pins J¹⁰ and P⁶ engage in slots Q' Q² respectively in a resetting rod Q, which has pivoted to it at its end a lever Q³ pivoted at Q⁴. When the resetting is to be effected by hand a spring plunger Q⁵ is depressed so as to act on the lever Q³ and pull the rod Q longitudinally. This rod Q will then act on one or other of the lever arms J⁹ or P⁵, whichever has been operated, and will bring the lever in question back into its original position when the corresponding cam disc will be free to be reset either under the action of the resetting spring H⁸ or by the reverse drive in the case of the underload clutch. The rod Q also carries a plate Q⁶ which engages with the plate M¹² on the catch M¹⁰ when the rod Q is operated and depresses the catch M¹⁰ against the action of its spring M¹² so as to allow it to pass the projections O³. The relative positions of the projections O³ and the ratchet teeth O² are such that when the mechanism is reset there is sufficient play to allow the recess O⁶ to move back out of position before the pawl O⁷ engages with the particular tooth O². Thus when the mechanism is reset, only the lever P' and the contacts P³ P⁴ are at once operated, the motor circuit being broken, whilst the other parts of the underload element remain in their positions. When next the station starts up the underload element will be reset, and if the station goes on load satisfactorily, the cam disc M will return to its zero position, when an upright pin M¹⁴ mounted on this disc will engage with the end of the arm O⁸ and release the pawl O⁷ from the teeth O², thus allowing the cam O and the disc O⁵ to be reset under the action of the spring O⁴. If the station does not go on load satisfactorily, it will be locked out as soon as the catch M¹⁰ has moved the disc O⁵ far enough to allow the finger P to drop into the recess O⁶. During the one and a half minutes taken for the station to start up, the underload cam disc M moves back through an angle equivalent to two minutes' forward running, so that the station will shut down in three and a half minutes if the machine synchronizes but fails to go on load and in six minutes if synchronizing fails after three attempts.

For the purpose of electrical resetting a resetting coil R (corresponding to the coil 105 in Figure 1) is provided, the ends of the coil being taken out to terminals R' adjacent to the terminals A⁵ for the motor A. The armature of this coil carries a lever R² which is pivoted at R³ and carries at its end a pin R⁴. The pin R⁴ engages in a slot R⁵ in a link R⁶ the other end of which is pivoted to the lever Q³. Thus when the coil R is energized by a current sent from the main station, it attracts its armature and pulls down the link R⁶, thereby operating the resetting rod Q in the manner above described. The lever R² has an extra arm R⁷ which engages with two contacts R⁸ and R⁹ (corresponding respectively to the contacts 106 and 107 of Figure 1), so that the energization of the coil R also closes the contact R⁸ (106) thereby maintaining the supply to the resetting coil R (105) (as will be seen from Figure 1) independently of the operation of the contacts J⁸ (95) and P⁴ (102), and opens the contact R⁹ (107) thus breaking the starting-up circuit. These contacts R⁸ R⁹ return to their normal positions when the supply of operating current from the main station is cut off and the coil R is deenergized.

It will be understood that the foregoing description has been given by way of example only, and that the invention is also applicable to other arrangements of automatic or semi-automatic substations.

What I claim as my invention and desire to secure by Letters Patent is:—

1. An automatic or semi-automatic electric substation, including in combination a load circuit, a generator adapted when running to supply power to the load circuit, an electric motor driving the generator, a power supply circuit for the motor, a starting-up relay controlled in accordance with the conditions of the load circuit, and a time-element contact-making device adapted to be brought into operation by the starting-up relay and having a plurality of contacts which are operated at predetermined time intervals and are so arranged as to initiate operations for starting up the motor-driven generator only after the necessary conditions in the load circuit have persisted for a predetermined time and also to allow a plurality of consecutive attempts to be made to start up the generator.

2. An automatic or semi-automatic electric substation, including in combination a load circuit, a generator adapted when running to supply power to the load circuit, an electric motor driving the generator, a power supply circuit for the motor, a master-control relay controlling the supply of power to the motor, a starting-up relay controlled in accordance with the conditions in the load circuit, and a time-element contact-making device adapted to be brought into operation by the starting-up relay and having a plurality of sets of contacts one of which acts to cause the operation of the master control relay when the necessary conditions in the load circuit have persisted for a predetermined time whilst another acts to lock out the substation in the event of the failure of a plurality of consecutive attempts to start up the motor-driven generator.

3. An automatic or semi-automatic electric substation controlled from a central station, including in combination a D. C. load circuit, a motor converter adapted when running to supply power to the load circuit, a main oil switch, A. C. supply mains from which power is supplied to the motor converter through the oil switch, a master control relay controlling the operation of the main oil switch, a starting-up relay controlled in accordance with the conditions of the load circuit and adapted to operate the master control relay, means for preventing the starting-up relay from operating the master control relay unless the necessary conditions in the load circuit persist for a predetermined time, time-delay mechanism associated with the starting-up relay and so arranged as to render it possible for a plurality of attempts to be made to start up the motor converter and means whereby in the event of failure of such attempts the time delay mechanism will act to lock out the substation and to give an indication at the central station.

4. An automatic or semi-automatic electric substation including in combination a load circuit, a generator adapted to supply power to the load circuit, an electric motor driving the generator, a power supply circuit for the motor, a starting-up device for the motor-driven generator, time-delay mechanism associated with the starting up device and so arranged as to render it possible for a plurality of consecutive attempts to be made to start up the motor-driven generator, a shutting down device, and time-delay mechanism associated with the shutting-down device and so arranged as to render it possible for a plurality of consecutive attempts to be made to throw the substation on to its load.

5. An automatic or semi-automatic electric substation, including in combination a load circuit, a generator adapted to supply power to the load circuit, an electric motor driving the generator, a power supply circuit for the motor, a starting-up device for the motor-driven generator, time-delay mechanism associated with the starting up device and so arranged as to render it possible for a plurality of consecutive attempts to be made to start up the motor-driven generator, a shutting down device, time-delay mechanism associated with the shutting-down device and so arranged as to render it possible for a plurality of consecutive attempts to be made to throw the substation on to its load, and means whereby in the event of failure of such attempts, either of the time-delay mechanisms will act to lock out the substation.

6. An automatic or semi-automatic electric sub-station, including in combination a load circuit, a generator adapted when running to supply power to the load circuit, an electric motor driving the generator, a power supply circuit for the motor, a master-control relay controlling the supply of power to the motor, a starting-up device controlled in accordance with the conditions in the load circuit and adapted to operate the master-control relay, time delay mechanism associated with the starting-up device and so arranged as to allow a plurality of consecutive attempts to be made to start up the motor-driven generator, a shutting-down device, and time delay mechanism associated with the shutting-down device and so arranged as to allow a plurality of consecutive attempts to be made to throw the generator on to its load.

7. An automatic or semi-automatic electric substation controlled from a central station, including in combination a D. C. load circuit, a motor converter adapted when running to supply power to the load circuit, A. C. supply mains from which power is supplied to the motor converter, a starting-up device for the motor converter, time-delay mechanism associated with the starting-up device and so arranged as to render it possible for three consecutive attempts to be made to start up the motor converter, a shutting-down device controlled from the D. C. side of the motor converter, time-delay mechanism associated with the shutting-down device and so arranged as to render it possible for three consecutive attempts to be made to throw the motor converter on to its load, and means whereby in the event of failure at the third attempt either of the time-delay mechanisms will act to lock out the substation and to give an indication at the central station.

8. An automatic or semi-automatic electric sub-station, including in combination a load circuit, a generator adapted when running to supply power to the load circuit, an electric motor driving the generator, a power supply circuit for the motor, a starting-up device controlling the supply of power to the motor, time delay mechanism associated with the starting-up device and so arranged as to allow a plurality of consecutive attempts to be made to start up the motor-driven generator, a shutting-down device, time delay mechanism associated with the shutting-down device and so arranged as to allow a plurality of consecutive attempts to be made to throw the generator on to its load, and a single driving shaft on which both the time delay mechanisms are driven.

9. An automatic or semi-automatic electric substation, including in combination a load circuit, a generator adapted when running to supply power to the load circuit, an electric motor driving the generator, a power supply circuit for the motor, a starting-up device controlling the supply of power to the motor, a shutting-down device controlled from the load circuit side of the generator, and a multiple time-element device comprising a plurality of time delay mechanism, a single driving shaft for these mechanisms, an electromagnetic clutch associated with the starting-up device and adapted to connect the driving shaft with one time-delay mechanism, and an electromagnetic clutch associated with the shutting-down device and adapted to connect the driving shaft with another time-delay mechanism.

10. An automatic or semi-automatic electric substation, including in combination a load circuit, a generator adapted when running to supply power to the load circuit, an electric motor driving the generator, a power supply circuit for the motor, a starting-up device controlling the supply of power to the motor, a shutting-down device controlled from the load circuit side of the generator, and a multiple time element device comprising a plurality of time delay mechanisms, a single driving shaft for these mechanisms, an electromagnetic clutch associated with the starting-up device and adapted to connect the driving shaft with one time delay mechanism, and an electromagnetic clutch associated with the shutting-down device and adapted to connect the driving shaft with another time delay mechanism, these time delay mechanisms being so arranged that they will allow a plurality of consecutive attempts to be made to start up the motor-driven generator and to throw it on to its load and that in the event of failure of such attempts they will act to lock out the sub-station.

11. An automatic or semi-automatic electric substation, including in combination a load circuit, a generator adapted to supply power to the load circuit, an electric motor driving the generator, a power supply circuit for the motor, means for starting up the motor-driven generator, an underload relay controlled in accordance with underload conditions on the load circuit side of the generator, and time delay mechanism associated with the underload relay and so arranged that it will shut down the sub-station when the underload conditions persist for a predetermined time and will allow a plurality of consecutive attempts to be made to throw the substation on to its load.

12. An automatic or semi-automatic electric sub-station, including in combination a load circuit, a generator adapted when running to supply power to the load circuit, an electric motor driving the generator, a power supply circuit for the motor, means for starting-up the motor-driven generator, an under-load relay controlled in accordance with underload conditions on the load circuit side of the generator, time delay mechanism associated with the under-load relay and so arranged that it will shut down the sub-station if the underload conditions persist for a predetermined time and will allow a plurality of consecutive attempts to be made to throw the sub-station on to its load, and means whereby in the event of failure of such attempts the time delay mechanism will act to lock out the sub-station.

13. An automatic or semi-automatic electric substation including in combination a load circuit, a generator adapted to supply power to the load circuit, an electric motor driving the generator, a power supply circuit for the motor, a starting-up relay controlled in accordance with the conditions of the load circuit and adapted to control the starting-up of the motor-driven generator, time-delay mechanism associated with the starting-up relay and so arranged that the necessary conditions in the load circuit must persist for a predetermined time before starting-up operations commence and that a plurality of consecutive attempts can be made to start up the motor-driven generator, a shutting-down device, and time delay mechanism associated with the shutting-down device and so arranged as to render it possible for a plurality of consecutive attempts to be made to throw the substation on to its load.

14. An automatic or semi-automatic electric substation, including in combination a load circuit, a generator adapted when running to supply power to the load circuit, an electric motor driving the generator, a power supply circuit for the motor, a master-control relay controlling the supply of power to the motor, a starting-up relay controlled in accordance with the conditions in the load circuit and adapted to operate the master-control relay, means for preventing the starting-up relay from operating the master-control relay unless the necessary conditions in the load circuit persist for a predetermined time, time delay mechanism associated with the starting-up relay and so arranged as to allow a plurality of consecutive attempts to be made to start up the motor-driven generator, a shutting-down device, time delay mechanism associated with the shutting-down device and so arranged as to allow a plurality of consecutive attempts to be made to throw the generator on to its load, and means whereby in the event of failure of such attempts either time delay mechanism will act to lock out the sub-station.

15. An automatic or semi-automatic electric sub-station, including in combination a load circuit, a generator adapted when running to supply power to the load circuit, an electric motor driving the generator, a power supply circuit for the motor, a starting-up device controlling the supply of power to the motor, time delay mechanism associated with the starting-up device and so arranged as to allow a plurality of consecutive attempts to be made to start up the motor-driven generator, an under-load relay controlled in accordance with underload conditions on the load circuit side of the generator, and time delay mechanism associated with the under-load relay and so arranged that it will shut down the sub-station when the underload conditions persist for a predetermined time and will allow a plurality of consecutive attempts to be made to throw the sub-station onto its load.

16. An automatic or semi-automatic electric sub-station, including in combination a load circuit, a generator adapted when running to supply power to the load circuit, an electric motor driving the generator, a power supply circuit for the motor, a starting-up relay controlled in accordance with the conditions of the load circuit and adapted to control the starting-up of the motor-driven generator, time delay mechanism associated with the starting-up relay and so arranged that the necessary conditions in the load circuit must persist for a predetermined time before starting-up operations commence, and that a plurality of consecutive attempts can be made to start up the motor-driven generator, an under-load relay controlled in accordance with underload conditions on the load circuit side of the generator, time delay mechanism associated with the under-load relay and so arranged that it will shut down the sub-station when the underload conditions persist for a predetermined time and will allow a plurality of consecutive attempts to be made to throw the sub-station on to its load, and means whereby in the event of failure of such attempts the time delay mechanism will act to lock out the sub-station.

17. An automatic or semi-automatic electric sub-station, including in combination a load circuit, a generator adapted when running to supply power to the load circuit, an electric motor driving the generator, a power supply circuit for the motor, means for starting-up the motor-driven generator, an under-load relay controlled in accordance with underload conditions on the load circuit side of the generator, time delay mechanism associated with the under-load relay and so arranged that it will shut down the sub-station when the underload conditions persist for a predetermined time, an over-load relay controlled in accordance with overload conditions on the load circuit side of the generator, and time delay mechanism associated with the over-load relay and so arranged that when the overload conditions persist for a predetermined time it will bring the under-load relay into operation to shut down the sub-station.

18. An automatic or semi-automatic electric sub-station, including in combination a load circuit, a generator adapted when running to supply power to the load circuit, an electric motor driving the generator, a power supply circuit for the motor, means for starting-up the motor-driven generator, an under-load relay controlled in accordance with underload conditions on the load circuit side of the generator, time delay mechanism associated with the under-load relay and so arranged that it will shut down the sub-station when the underload conditions persist for a predetermined time, an over-load relay controlled in accordance with overload conditions on the load circuit side of the generator, time delay mechanism associated with the over-load relay and so arranged that when the overload conditions persist for a predetermined time it will bring the under-load relay into operation to shut down the sub-station, discriminating mechanism associated with the under-load time delay mechanism and so arranged as to allow a plurality of consecutive attempts to be made to throw the substation on to its load, and means whereby in the event of failure of such attempts the discriminating mechanism will act to lock out the sub-station.

19. An automatic or semi-automatic electric sub-station, including in combination a load circuit, a generator adapted when running to supply power to the load circuit, an electric motor driving the generator, a power supply circuit for the motor, a starting-up relay controlled in accordance with the conditions in the load circuit and adapted to control the starting-up of the motor-driven generator, time delay mechanism associated with the starting-up relay and so arranged that the necessary conditions in the load circuit must persist for a predetermined time before starting-up operations commence, an under-load relay controlled in accordance with underload conditions on the load circuit side of the generator, time delay mechanism associated with the under-load relay and acting to shut down the substation when the underload conditions persist for a predetermined time, an over-load relay controlled in accordance with overload conditions on the load circuit side of the generator, time delay mechanism associated with the over-load relay and so arranged that when the overload conditions persist for a predetermined time it will bring the under-load relay into action to shut down the sub-station, a single driving shaft from which the three time delay mechanisms are driven, and electromagnetic clutches which will act respectively to connect the shaft with a time delay mechanism when operated by the corresponding relay.

20. An automatic or semi-automatic electric substation including in combination a D. C. load circuit, a high speed circuit breaker, a motor converter adapted when running to supply power to the load circuit through the circuit breaker, a main oil switch, A. C. supply mains from which power is supplied to the motor converter through the oil switch, a starting-up device adapted to operate the oil switch and thereby to start up the motor converter, means for operating the circuit breaker after the starting-up operations have been completed, an underload relay controlled in accordance with underload conditions on the D. C. side of the motor-converter, time-delay mechanism associated with the underload relay and so arranged that it will cause the substation to be shut down when the underload conditions persist for a predetermined time, and discriminating mechanism associated with this time-delay mechanism and acting to prevent repeated starting-up and shutting-down of the substation due to external faulty conditions.

21. An automatic or semi-automatic electric substation including in combination a D. C. load circuit, a high speed circuit breaker, a motor converter adapted when running to supply power to the load circuit through the circuit breaker, a main oil switch, A. C. supply mains from which power is supplied to the motor converter through the oil switch, a starting-up device adapted to operate the oil switch and thereby to start up the motor converter, means for operating the circuit breaker after the starting-up operations have been completed, a shutting-down device controlled from the D. C. side of the motor converter, and a multiple time-element device comprising a plurality of time-delay mechanisms, a single driving shaft for these mechanisms, an electromagnetic clutch associated with the starting-up device and adapted to connect the driving shaft with one time-delay mechanism, and an electromagnetic clutch associated with the shutting-down device and adapted to connect the driving shaft with another time-delay mechanism the time-delay mechanisms being so arranged as to render it possible for a plurality of consecutive attempts to be made to start up the motor converter and to throw it on to its load.

22. An automatic or semi-automatic electric substation, including in combination a D. C. load circuit, a motor converter adapted when running to supply power to the load circuit, A. C. supply mains from which power is supplied to the motor converter, a starting-up relay controlled in accordance with the conditions of the load-circuit, a synchronizing relay operative when the motor converter is rotating in synchronism, underload and overload relays each controlled in accordance with the conditions on the D. C. side of the motor converter, and a multiple time-element device comprising four time-delay mechanisms associated respectively with the four relays, a single driving shaft for these mechanisms, and four electromagnetic clutches each controlled by a relay and adapted to connect the driving shaft with the appropriate time-delay mechanism.

23. An automatic or semi-automatic electric substation controlled from a central station, including in combination a load circuit, a generator adapted when running to supply power to the load circuit, an electric motor driving the generator, a power supply circuit for the motor, means for starting up the motor-driven generator and for connecting it to its load circuit, time-interval contact-making devices so arranged as to render it possible for a plurality of consecutive attempts to be made to throw the substation on to its load and to lock out the substation in the event of failure of such attempts, and means controlled electrically from the central station whereby the apparatus in the substation can be reset after locking-out.

24. An automatic or semi-automatic electric substation controlled from a central station, including in combination a D. C. load circuit, a motor converter adapted when running to supply power to the load circuit, A. C. supply mains from which power is supplied to the motor converter, a starting-up device for the motor converter, a shutting-down device controlled from the D. C. side of the motor converter, time-delay mechanism associated with the starting-up device and so arranged as to render it possible for a plurality of consecutive attempts to be made to start up the motor converter, time delay mechanism associated with the shutting-down device and so arranged as to render it possible for a plurality of consecutive attempts to be made to throw the substation on to its load, means whereby in the event of failure of such attempts either of the time-delay mechanisms will act to lock out the substation, a single driving shaft for the two time-delay mechanisms, electromagnetic clutches adapted to connect the driving shaft selectively to the time-delay mechanisms, and means controlled electrically from the central station whereby the time-delay mechanisms can be reset after locking-out.

In testimony whereof I have signed my name to this specification.

RICHARD CALDWELL MINTON.